United States Patent [19]

Kobayashi

[11] Patent Number: 4,675,476
[45] Date of Patent: Jun. 23, 1987

[54] MAGNETOPHORESIS TYPE DISPLAY AND GRAPHIC INPUT/OUTPUT DEVICE USING THE SAME

[75] Inventor: Tadashi Kobayashi, Tokyo, Japan

[73] Assignee: NEC Corporation, Japan

[21] Appl. No.: 785,327

[22] Filed: Oct. 7, 1985

[30] Foreign Application Priority Data

Oct. 11, 1984 [JP] Japan .................................. 59-212868
May 10, 1985 [JP] Japan .................................. 60-99130

[51] Int. Cl.$^4$ ...................... G08C 21/00; G09F 19/00
[52] U.S. Cl. ........................................ 178/18; 340/709;
340/787; 340/788; 40/426; 40/449; 346/21;
434/409
[58] Field of Search ................... 178/18, 19; 340/706,
340/709, 763, 764, 815.05, 787, 788; 40/406,
426, 449; 346/19, 21, 74.3; 434/409; 33/1 M

[56] References Cited

U.S. PATENT DOCUMENTS

| | | | |
|---|---|---|---|
| 3,055,113 | 9/1962 | Grandjean | 346/21 X |
| 3,570,445 | 3/1971 | Johnson | 40/426 X |
| 3,591,939 | 7/1971 | Payne et al. | 340/788 X |
| 4,288,936 | 9/1981 | Okutsu | 40/426 |

Primary Examiner—Stafford D. Schreyer
Attorney, Agent, or Firm—Laff, Whitesel, Conte & Saret

[57] ABSTRACT

A magnetophoresis type display suited to display characters, graphics and other patterns which are entered into a handwriting input device, and a graphic input/output device which, by utilizing such a display, in an input mode generates an electric signal (graphic signal) indicative of coordinates of an input point and, in a display mode, displays a pattern responsive to a graphic signal applied thereto. The display is provided with means for partially erasing a pattern which has been entered and displayed. The partial erase means comprises a carriage loaded with a magnet which is movable vertically and horizontally driven by a drive mechanism.

23 Claims, 22 Drawing Figures

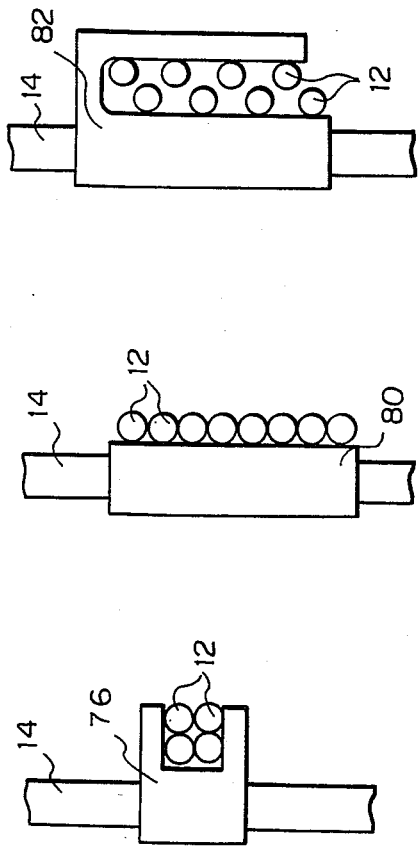

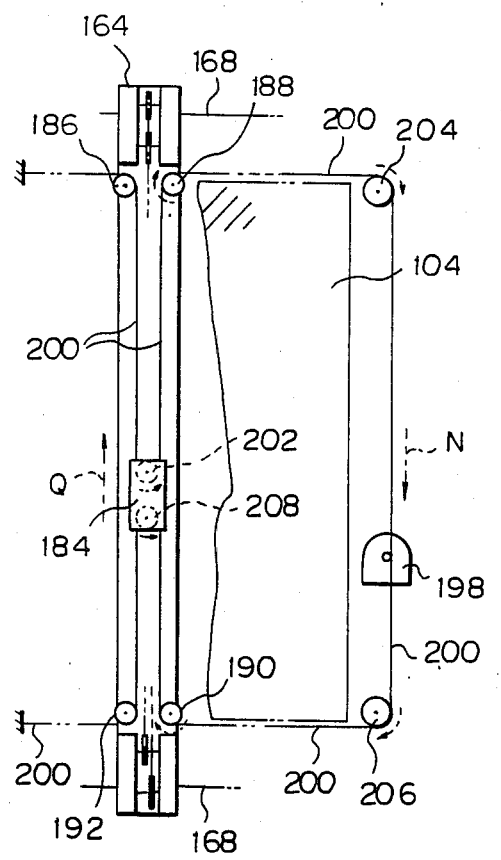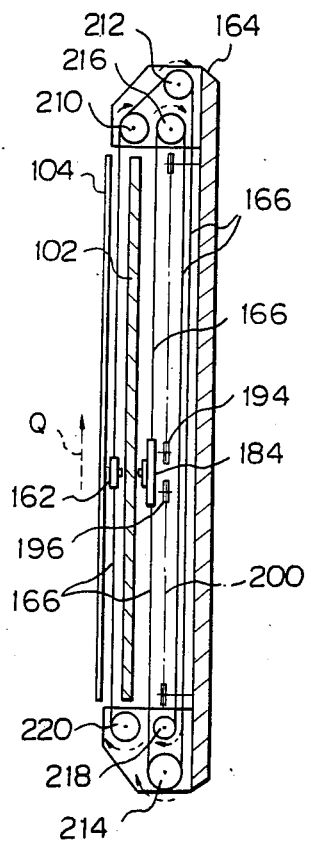
Fig. 14A
Fig. 14B

MAGNETOPHORESIS TYPE DISPLAY AND GRAPHIC INPUT/OUTPUT DEVICE USING THE SAME

BACKGROUND OF THE INVENTION

The present invention relates to a magnetophoresis type display suited to display data which are entered into a handwriting input device, and a graphic input-/output device which, by utilizing such a display, in an input mode generates an electric signal (graphic signal) indicative of coordinates of a particular entered point and, in a display mode, displays a pattern associated with a supplied graphic signal.

Recently, a magnetophoresis type display has been developed and put to practical use which displays characters, graphics and other patterns which are written into a magnetrophoretic display panel by means of an electromagnet, which has a pen configuration. This type of display, developed by The Pilot Pen Co., Ltd. (Japan), includes a pair of transparent spaced sheets which are located to face each other. The clearance between the transparent sheets is partitioned to define a great number of small cells. Each of the cells is filled with viscous white liquid which contains particles of a black magnetic material such as ferrite. When a person enters a desired pattern into a certain area of one surface of the display panel using the electromagnetic pen, the magnetic particles in those cells which are covered by that particular area are magnetically attracted by the pen toward the above-mentioned surface to render the desired pattern in black. She or he may erase the displayed pattern by moving a permanent magnet on and along the other surface of the display panel to attract the magnetic particles toward that surface. This erases black patterns over the entire display surface of the panel, thereby causing the whole display surface to turn white.

The problem with the above-described type of prior art magnetophoretic display is that what it can do in an erase mode is simply cleaning the whole display surface. Specifically, where data entered into a handwriting input device are to be displayed, it is desirable to furnish the input device with a partial erase mode in order to enhance efficient partial correction of entered data. A prior art display of the type concerned, however, is incapable of partially erasing patterns being displayed despite the desirable partial erase mode.

Meanwhile, a blackboard heretofore widely used for conference and other applications is incrasingly replaced with a large-size graphic input device which functions to transform characters, graphics and other patterns entered by hand into electric signals. Specifically, the graphic input device electromagnetically senses a particular position of a pen on the input surface of a tablet and, then, generates a graphic signal indicative of coordinates of the pen input position. This type of graphic input device is disclosed in, for example, pending U.S. patent application Ser. No. 654,803 filed Sept. 25, 1984 (now U.S. Pat. No. 4,568,799 granted Feb. 4, 1986) and assigned to the same assignee as the present application. The graphic input device comprises two perpendicular groups of conductors which are arranged in an input surface of a tablet in a grid configuration. A pen used with the device for entry of data is provided with a coil. When a person enters data using the pen, the device locates an electromagnetic coupling between the conductor groups in the input surface and the coil of the pen, generating a graphic signal representative of the coordinates of the pen input point. Such graphic signals may be stored for future reproduction or transmitted to a remote location for display.

Usually, display of data which are entered into the graphic input device is implemented by a cathode ray tube (CRT). However, since the input surface of the graphic input device and the display surface of the CRT are placed in spaced positions and since they are not equally dimensioned, it needs formidable time and labor for a person to effect addition of data, partial erasure and other partial corrections while watching patterns being displayed.

An approach to eliminate the above drawback is a graphic input/output device which includes a special screen for display which is superposed on an input surface. This kind of device transforms graphic signals into image patterns and projects the image patterns onto the screen by means of a projector. Since the image patterns appearing on the screen have the same dimensions as and occupy the same positions as the previously entered patterns, a person is allowed to effect partial corrections tracing the patterns being displayed. However, the projector scheme cannot avoid the drawback that the projector and the screen have to be located at a substantial spacing from each other and, in addition, a display with high resolution is expensive.

To eliminate the drawbacks particular to the prior art graphic input devices discussed hereinabove, the present invention uses the magnetophoresis type display, particularly its display panel, as means for displaying entered data.

SUMMARY OF THE INVENTION

It is a first object of the present invention to provide a magnetophoresis type display which is capable of partially erasing patterns being displayed.

It is a second object of the present invention to provide a space- and cost-effective graphic input/output device which utilizes a magnetophoresis type display.

In one aspect of the present invention, there is provided a magnetophoresis type display for displaying entered character and graphic patterns which includes a display panel consisting of two opposing flat sheets at least one of which is transparent, a clearance defined between opposed surfaces of the two sheets, a plurality of partitions disposed in the clearance, a plurality of cells defined by the partitions, and viscous liquid containing particles of a magnetic material and filling each of the cells. A writing device has a first magnetic pen for generating in a write mode a magnetic field which attracts the magnetic particles, and a first guide mechanism for moving the first magnetic pen to a write position over one of opposite surfaces of the display panel. A partial erasing device has a second magnetic pen for generating a magnetic field which attracts the magnetic particles, and a second guide mechanism for moving the second magnetic pen to a partial erase position over the other surface of the display panel.

In another aspect of the present invention, there is provided a graphic input device which indicates coordinates of an input position of a pen adapted to input character and graphic patterns which includes an input panel having an input surface on which two groups of conductors are arranged in a grid configuration. A display panel consists of two flat sheets which face each other, a clearance defined between opposing surfaces of the two sheets, a plurality of partitions disposed in the clearance, a plurality of cells defined by the partitions, and viscous liquid containing particles of a magnetic material and filling each of the cells. The display panel is superposed on the input panel to constitute an input-/output panel. An input pen has a coil for selectively electromagnetically coupling with the conductor groups of the input panel in an input mode. A display input device has a plurality of magnets for applying magnetic attraction to the magnetic particles when the display panel is accessed. A drive device moves the magnets to an access position responsive to an electric signal indicative of a particular position. A coordinates detecting device locates an electromagnetic coupling between the conductor groups of the input panel and the pen and, thereupon, generates an electric signal indicative of input coordinates of the pen which is associated with the magnetic coupling.

In accordance with the present invention, a magnetophoresis type display suited to display characters, graphics and other patterns which are entered into a handwriting input device, and a graphic input/output device which, by utilizing such a display, in an input mode generates an electric signal (graphic signal) indicative of coordinates of an input point and, in a display mode, displays a pattern responsive to a graphic signal applied thereto are disclosed. The display is provided with means for partially erasing a pattern which has been entered and displayed. The partial erase means comprises a carriage loaded with a magnet which is movable vertically and horizontally driven by a drive mechanism.

The above and other objects, features and advantages of the present invention will become more apparent from the following detailed description taken with the accompanying drawings.

BRIEF DESCRIPTION OF THE DRAWINGS

FIGS. 6A–6C are front views each showing a construction in which a plurality of magnetic pens are loaded on a carriage;

FIGS. 14A and 14B respectively are a front view and a side elevation of a specific construction of a mechanism adapted to move a magnetic write pen and a magnetic erase pen which are shown in FIG. 13 in an interlocked relation.

DESCRIPTION OF THE PREFERRED EMBODIMENTS

While the magnetophoresis type display and graphic input device using the same of the present invention is susceptible of numerous physical embodiments, depending upon the environment and requirements of use, substantial numbers of the herein shown and described embodiments have been made, tested and used, and all have performed in an eminently satisfactory manner.

First, one embodiment of an improved magnetophoresis type display which is directed to achieving the first object of the present invention will be described with reference to the accompanying drawings.

Figure 1:
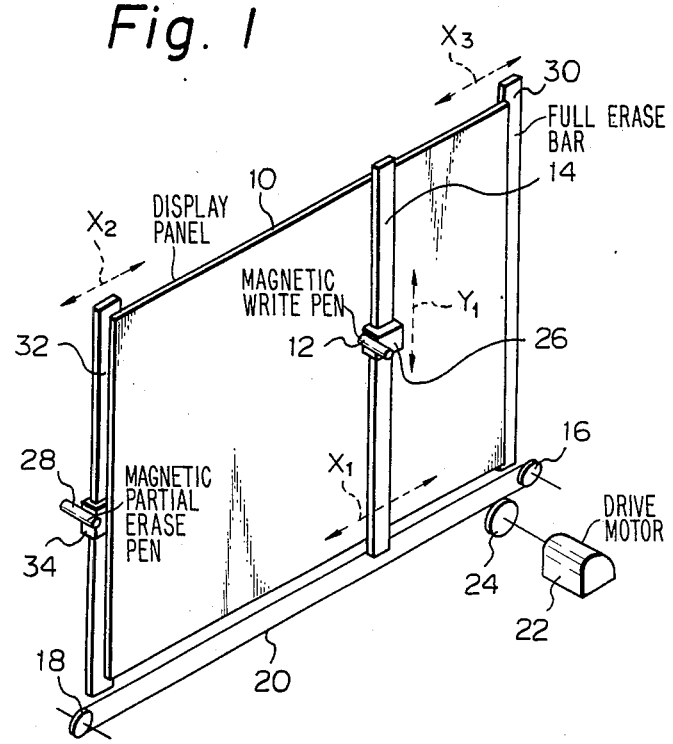
FIG. 1 is a perspective view of a magnetophoresis type display embodying the present invention.

Referring to FIG. 1, the improved display of the present invention includes a magnetophoretic display panel 10. Arranged at the front of the display panel 10 is a mechanism for moving a magnetic write pen 12 to a desired position for writing data. Specifically, a bar 14 is positioned in the vicinity of the front face of the display panel 10 and, at its lower end, retained by a wire 20, which in turn is passed over a pair of spaced pulleys 16 and 18. As a motor 22 is energized to drive the wire 20 through a pulley 24, the bar 14 which is integral with the wire 20 is movable over parallel paths in a direction indicated by an arrow $X_1$. A carriage 26 is slidable on and along the bar 14 as indicated by an arrow $Y_1$, while the magnetic pen 12 is rigidly mounted on the carriage 26. The pen 12 is movable to a desired position by controlling the drive arrangement adapted to move the bar 14 as indicated by the arrow $X_1$ (i.e. motor 22, pulley 24, wire 20 and pulleys 16 and 18) and a drive arrangement, not shown, for moving the carriage 26 as indicated by the arrow $Y_1$. To write data into the display panel 10, the pen 12 is moved to a desired position and, then, activated to magnetically attract those magnetic particles in the display panel 10 which are covered by the effective range of the magnetism toward the front face of the display panel 10, thereby rendering a desired pattern on the front face of the display panel 10.

Arranged at the back of the display panel 10 are a drive mechanism for moving a magnetic partial erase pen 28 to a desired position, and a full erase bar 30 which comprises a magnet. The drive mechanism associated with the partial erase pen 28, like the drive mechanism associated with the write pen 12, includes a bar 32 which is movable over parallel paths as indicated by an arrow $X_2$. A carriage 34 is slidable on and along the bar 32 while carrying the pen 28 therewith. To erase a part of data written into the display panel 10, a drive arrangement associated with the bar 32 and that associated with the carriage 34, both not shown, are controlled to move the pen 28 to a desired position so that those magnetic particles which lie in the effective range of the magnetism of the pen 28 are attracted toward the back face of the display panel 10. The bar 30 which comprises an elongate permanent magnet is movable over parallel paths as indicated by an arrow $X_3$ driven by a drive arrangement similar to that associated with the bar 14, not shown. To erase the whole data being displayed on the panel 10, the full erase bar 30 is omved to sweep the whole panel surface, from one end to the other and, so that all the magnetic particles in the panel 10 are attracted toward the back face.

Figure 2:
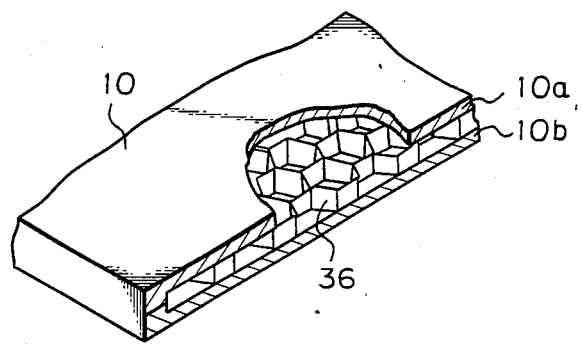
FIG. 2 is a partly taken away perspective view of a display panel which is included in the display of FIG. 1.

Referring to FIG. 2, a specific construction of the display panel 10 is shown. As shown, the display panel 10 comprises a pair of spaced transparent sheets 10a and 10b which are positioned to face each other. The clearance between the sheets 10a and 10b is divided by a honeycomb 36 into a number of small cells. Each of the cells is filled with white viscous liquid which contains particles of a black magnetic material such as ferrite and has substantially the same specific gravity as the magnetic material.

Figure 3A:
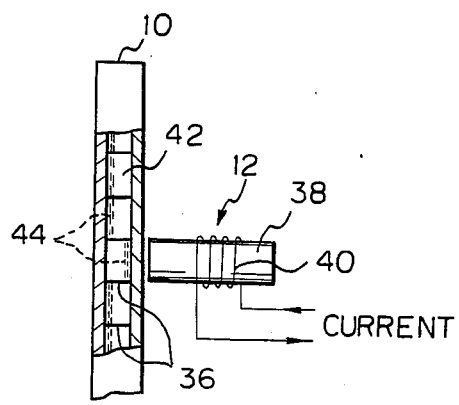
FIGS. 3A and 3B are side elevations each showing a specific construction of a magnetic pen.
Figure 3B:
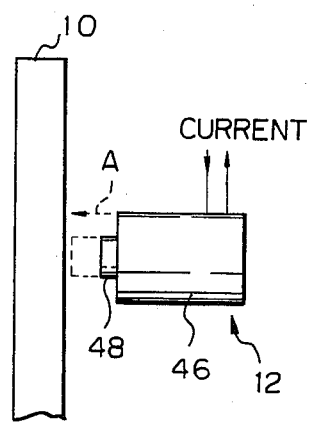

Referring to FIGS. 3A and 3B, specific constructions of the pen 12 (or 28) applicable to the illustrative embodiment are shown. In FIG. 3a, the pen 12 comprises an electromagnet which is made up of a core 38 and a coil 40 wound around the core 38. When the coil 40 is energized, the resulting magnetism attracts the black magnetic particles 44 to cause them to migrate through the white liquid 42 and adhere to the inner surface of either one of the transparent sheets which is closer to the pe n38 than the other. In FIG. 3B, the pen 12 comprises a solenoid 46 and a permanent magnet 48 which is mounted on the solenoid 46. Upon energization of the solenoid 46, the magnet 48 is projected as indicated by an arrow A to a position where its tip neighbors the display panel 10 to attract the magnetic black particles 44. In any of the two pen constructions, therefore, write (or partial erase) on and off commands can be provided by turning on and off the supply of a current to the coil 40 or the solenoid 46.

As described above, the display in this particular embodiment includes not only the full erase magnetic bar 30 but also the particle erase magnetic pen 28, and a mechanism for moving the pen 28 to a desired erase position. Such allows patterns being displayed to be partially erased responsive to partial erase information which is delivered to the display from a handwriting input device.

Figure 4:
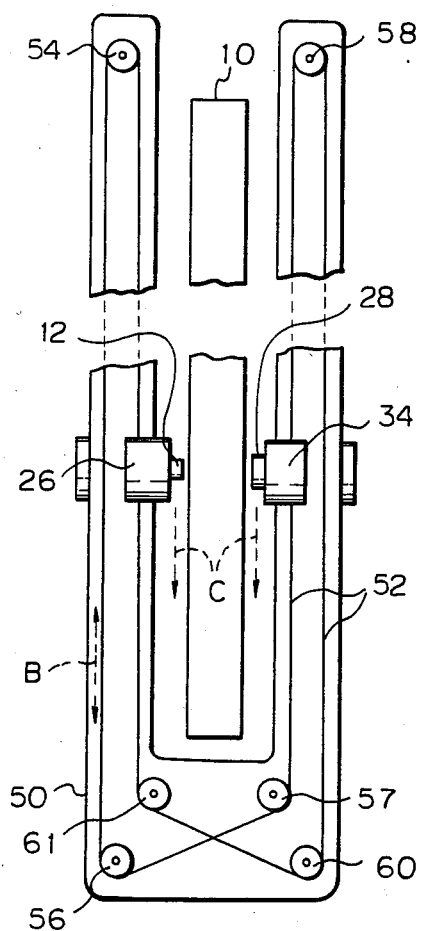
FIG. 4 is a side elevation of a drive section.

Referring to FIG. 4, there is shown a structure in which the bars 14 and 32 shown in FIG. 1 are interlocked with each other. In FIG. 1, although the bars 14 and 32 are designed to be movable independently of each other in FIG. 1, the independent movements cannot be implemented without resorting to independent drive mechanisms, which would increase the overall size and cost of the device. The integral bar structure shown in FIG. 4 eliminates such a drawback by arranging the write pen 12 and partial erase pen 28 to be movable at the same time. Specifically, a bar 50 shown in FIG. 4 includes a bar moving the carriage 26 and a bar for moving the carriage 34, the two bars being interconnected at one end to have an integral configuration. A wire 52 is anchored to the carriages 26 and 34 and passed over four pulleys 54, 56, 57; 58, 60 and 61 to run crosswise as illustrated. In this construction, as the wire 52 is driven as indicated by an arrow B, it moves the carriages 26 and 34 in the same direction and over the same distance as indicated by arrows C. Only if the carriages 26 and 34 are fixed to the wire 52 in such positions that the centerlines of the pens 12 and 28 are located at the same level, the pens 12 and 28 will constantly assume the same level with no regard to the movement of the carriages 26 and 34.

The specific structure shown in FIG. 4 is practicable with only a single drive arrangement adapted to drive the bar 50 horizontally and a single drive arrangement adapted to drive the carriages 26 and 34 vertically. This promotes a reduction in the size and cost of the whole device. In addition, in FIG. 4, the pen 28 is provided with a larger diameter than the pen 12 in order to prevent data which is to be erased from being left unerased in a partial erasure mode.

Figure 5A:
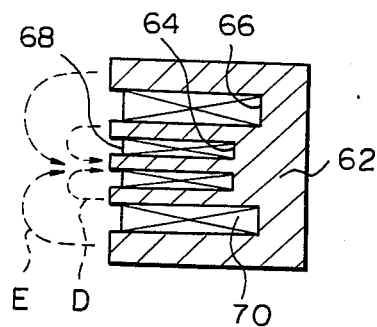
FIGS. 5A and 5B are sectional side elevations each showing another specific construction of the magnetic pen.
Figure 5B:
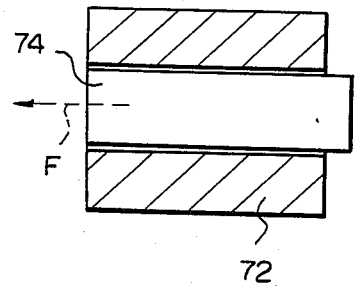

Referring to FIGS. 5A and 5B, there are shown other specific structures of the tip of the pen 12 (or 28) which are associated with the constructions of FIGS. 3A and 3B, respectively. Where the pen 12 shown in any of FIGS. 3A and 3B is used, the line width of a pattern to be written or partially erased cannot be changed without replacing the pen with another pen the tip of which has a different diameter; frequent change of the line width, therefore, would consume considerable time and labor. Each of the tip configuration shown in FIGS. 5A and 5B allows the line width to be varied without replacing the pen and, thereby, frees the user from the above inconvenience.

In FIG. 5A, the pen tip comprises a cylindrical core 62 which is formed with two annular and concentric recesses or grooves 64 and 66. A coil 68 is received in the radially inner groove 64, and a coil 70 in the radially outer groove 66. In a write mode (or partial erase mode), a comparatively narrow line width may be selected by causing a current to flow only through the coil 68 to develop lines of magnetic force D, while a comparatively broard line width may be selected by causing a current to flow only through the coil 70 to develop lines of magnetic force E. That is, it is possible to change the line width as desired without consuming much time and labor and simply by selecting the coil 68 or the coil 70.

In FIG. 5B, on the other hand, the pen tip comprises a circular and tubular permanent magnet 72, and a cylindrical permanent magnet 74 exceeding throughout the magnet 72. A comparatively narrow line width is attainable by projecting only the magnet 74 toward the display panel as indicated by an arrow F, and a comparatively broad line width by projecting both the magnets 72 and 74.

Referring to FIGS. 6A-6C, other specific pen and carriage arrangements in accordance with the present invention are shown in which a plurality of pens 12 (or 28) are loaded in a carriage. Where the carriage 26 (or 34) is loaded with a single pen 12 (or 28) as shown in FIG. 1, a problem would be given rise to that, especially, reducing the pen tip diameter and, therefore, the pixel with the intention of allowing minute patterns to be written (or partially erased) leads to the increase in the period of time necessary for writing (or partially erasing) the patterns. The structure shown in any of FIGS. 6A-6C is designed to overcome such a shortcoming.

In FIG. 6A, a plurality of pens 12 are arranged in a matrix on a carriage 76. In FIG. 6B, they are arranged in a line on a carriage 80. In any of the matrix and line configurations, a write on or off command is simultaneously applied to the pens 12 responsive to a pattern to be written (or partially erased), so that a plurality of pixels defined by the pens 12 may be written (or partially erased) at the same time to shorten the period of time necessary for a pattern to be written (or partially erased). In FIG. 6C, a plurality of pens 12 are arranged on a carriage 82 in two staggered lines. The structure of FIG. 6C is desirably applicable to a case wherein the tip of each pen 12 is too narrow for the pens 12 to be arranged in a line as shown in FIG. 6B. It, like the other configurations discussed above, successfully cuts down the period of time.

As described above, the illustrative embodiment realizes a magntophoresis type display which allows a pattern being displayed to be partially erased as desired.

Hereinafter will be described preferred embodiments of an improved graphic input device which utilizes the above-discussed magnetophoresis type display in order to achieve the previously mentioned second embodiment of the present invention.

Figure 7:
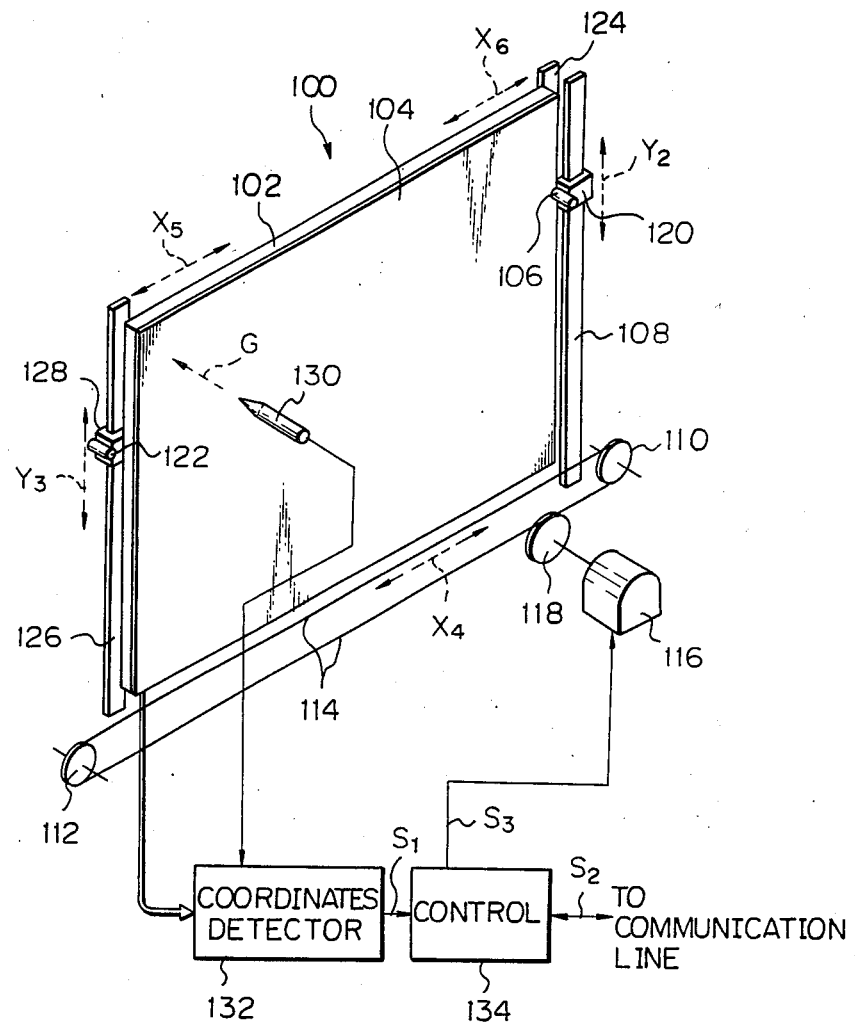
FIG. 7 is a perspective view of a first embodiment of a graphic input device in accordance with the present invention.

Referring to FIG. 7, a first embodiment of the graphic input device in accordance with the present invention is shown. An input/output panel, generally 100, comprises a display panel 102 and an input panel 104 which are superposed on each other. Arranged at the front of the input/output panel 100 is a mechanism for moving a magnetic write pen 106 to a desired position over the panel 100. Specifically, a bar 108 is positioned at the front of the panel 100, while a wire 114 is passed over a pair of pulleys 110 and 112 and anchored at opposite ends thereof to the bar 108. As a motor 116 is energized to drive the wire 114 through a pulley 118, the bar 108 is moved over parallel paths as indicated by an arrow $X_4$. A carriage 120 is slidable on and along the bar 108 as indicated by an arrow $Y_2$. The carriage 120 carries therewith a magnetic pen 106. A mechanism for driving the carriage 120 is not shown in the drawing.

Arranged at the back of the input/output panel 100 are a mechanism for moving a magnetic partial erase pen 122 to a desired position on the panel 100, and a full erase magnetic bar 124. The pen drive mechanism includes a bar 126 which is movable in a direction indicated by an arrow $X_5$, and a carriage 128 which is slidable on and along the bar 126 as indicated by an arrow $Y_3$. The pen 122 is mounted on the carriage 128. A drive mechanism associated with the carriage 128 is not shown. The magnet bar 124 comprises an elongate permanent magnet which is driven in a direction indicated by an arrow $X_6$ by a mechanism, not shown, which is simlar to the drive mechanism associated with the bar 108.

In an input mode, as data is written down in the input panel 104 using an input pen 130 as represented by an arrow G, a coordinates detecting circuit 132 locates an electromagnetic coupling between a coil built in the pen 130 and conductor groups built in the input panel 104 and, then, generates an electric signal indicative of coordinates of the particular input point associated with the pen 130, i.e. graphic signal $S_1$. The graphic signal $S_1$ is applied to a control circuit 134. The control circuit 134, responsive to a command delivered thereto from the outside, stores the graphic signal $S_1$ in a storage or feeds it to a communication line which leads to another input/output device.

In a display mode, the control 134 responds to a graphic signal read out of the storage or a graphic signal $S_2$ which comes in through the communication line from another input/output device, applying an electric signal $S_3$ to the motor 116 for controlling the rotation speed (or angle) of the motor 116. The signal $S_3$ rotates the motor 116 so as to move the bar 108 to a specific position which is designated by the graphic signal. At the same time, the carriage 120 is moved to a particular write position so that the pen 106 writes a pattern on the display panel 102.

In a partial erase mode, the pen 122 is moved to a desired partial erase point as in a display mode so as to partially erase a pattern being displayed.

Further, in a full erase mode, the magnet bar 124 is cause to sweep the entire display panel 102 from one side to the other side, thereby fully erasing patterns being displayed.

The motor 116 may comprise a pulse motor whose rotation angle is controlled by pulses, or a servo motor provided with a rotary encoder. If desired, an arrangement may be made such that the coordinates detector 132 locates an electromagnetic coupling between a coil, which is built in the pen 106 (or 122), and the conductor groups in the input panel 104 to generate a graphic signal representative of the position of the pen 106 (or 122), while a feedback circuit controls the motor rotation in such a manner as to equalize a graphic signal fed from the control 134 to the motor 116 to the graphic signal generated by the coordinates detector 132. Such an arrangement will eliminate accumulation of position errors which is inherent in non-feedback open control. In that case, the motor 116 may be implemented by an ordinary DC motor.

Figure 8:
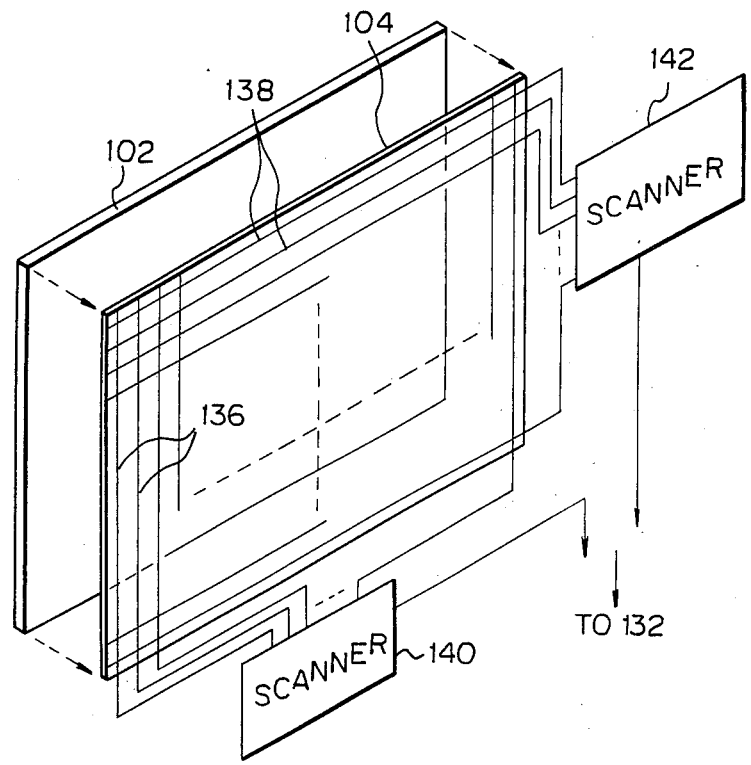
FIG. 8 is a perspective view of a specific construction of an input/output panel included in the embodiment of FIG. 7.

Referring to FIG. 8, a specific structure of the input/output panel in accordance with the first embodiment discussed above is shown. As shown, the input panel 104 comprises a transparent sheet on the back of which a group of thin conductors 136 for defining Y axis and a group of thin conductors 138 for defining X axis are arranged in a grid configuration while being insulated from each other. The conductor groups 136 and 138 respectively are connected to scanning circuits 140 and 142 which in turn are connected to the coordinates detector 132. The display panel 102 is constructed in exactly the same manner as in FIG. 2.

The pens 106 and 122 included in the first embodiment are each constructed employing the structure shown in FIG. 3A or 3B.

Figure 9A:
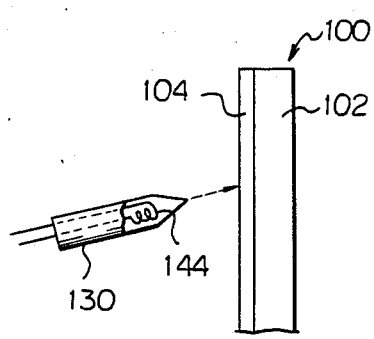
FIGS. 9A and 9B are side elevations each showing the input/output panel in a specific position for use.
Figure 9B:
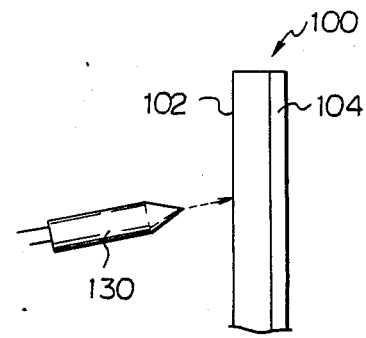

Referring to FIGS. 9A and 9B, different configurations of the input/output panel 100 in accordance with the first embodiment are shown in side elevations. In FIG. 9A, the panel 100 which is a laminate of the display panel 102 and input panel 104 is designed such that the input panel 104 provides an input surface while, in FIG. 9B, it is designed such that the display panel 102 provides an input surface. In FIG. 9A, the input panel 104 is transparent so that data appearing on the display panel 102 may be visible from the front. In FIG. 9B, on the other hand, the input surface does not need to be transparent because data on the display panel 102 are visible directly from the front. In any of the configurations of FIGS. 9A and 9B, in an input mode, the scanning circuits 140 and 142 and the coordinates detector 132 scan and locate an electromagnetic coupling between the coil 144 built in the pen 130 and the conductor groups 136 and 142 shown in FIG. 8, thereby generating a graphic signal $S_1$.

In the first embodiment shown in FIG. 7, the write pen 106 is disposed on the input surface and, hence, it is the prerequisite that in an input mode, which uses the pen 130, the pen 106 be kept out of the input surface and maintained unmovable there so as not to interfere with the movement of the pen 130. It follows that in the event of displaying entered data on the display panel 102, a graphic signal generated in an input mode has to be temporarily stored in a storage and, during a later period other than an input mode period, it has to be retrieved from the storage and the pen 106 has to be moved to a write position to write the retrieved data. To eliminate such waste of time, a magnet for writing data in an input mode may be incorporated in the pen 130 as will be described.

Figure 10A:
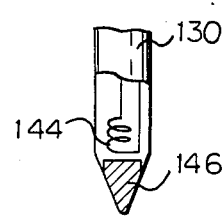
FIGS. 10A and 10B are partly taken away side elevations each showing a specific construction of a pen for entering data.
Figure 10B:
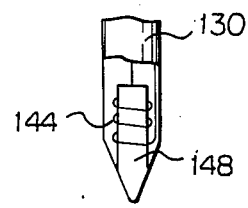

Referring to FIGS. 10A and 10B, specific structures of the pen 130 in accordance with the first embodiment are shown. In FIG. 10A, a permanent magnet 146 for display writing is fit in the tip of the input pen 130. In FIG. 10B, a core 148 of a display write electromagnet is built in the tip of the pen 130. Where pen 130 of FIG. 10A is used in entering data into the input surface of the panel 100, patterns will appear on the display panel 102 due to the magnetism of the permanent magnet 146, as has been discussed with reference to FIG. 3B. Concerning the pen 130 of FIG. 10B, on the other hand, a current will be applied in an input mode to a coil 144 which is wound around the core 148, thereby writing an input pattern into the display panel 102 as in the case of FIG. 3A.

Figure 11A:
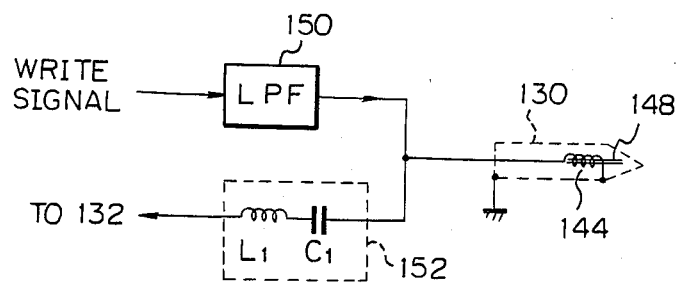
FIGS. 11A and 11B respectively are a diagram of a circuit for applying signals to the pen and a timing chart representative of the operation of the circuit.
Figure 11B:
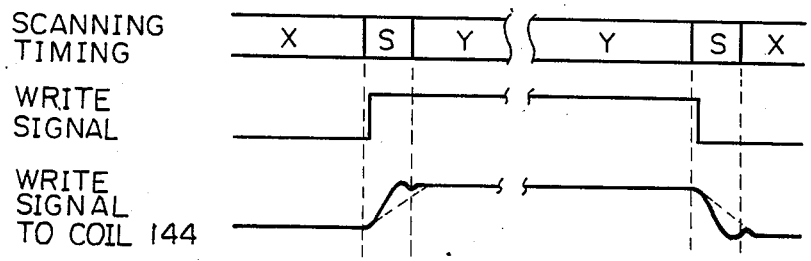

Referring to FIGS. 11A and 11B, there respectively are shown a block diagram representative of exemplary connection of a write signal to the coil 144 of the pen 130 shown in FIG. 10B and a timing chart demonstrating the operation of the same. In this particular arrangement, the electromagnetic coupling between the conductors 136 and 138 of the input panel 104 (see FIG. 8) and the coil 144 of the pen 130 is implemented with a high-frequency carrier, while the write signal is implemented with a direct current (or alternating current whose frequency is lower than the high-frequency carrier which is applied to the coil 144 only during an input mode operation which uses the pen 130. The write signal is applied to the coil 144 of the pen 130 via a low-pass filter (LPF) 150. A bandpass filter (BPF) 152 is connected between the coil 144 and the coordinates detector 132.

An arrangement is made such that the write signal rises and falls in write on/off periods S each intervening between an X-axis scanning period X and a Y-axis scanning period Y. The LPF 150 functions to suppress high-frequency signal components which develop at the positive-going and negative-going edges of the write signal, while the BPF 152 passes a frequency band close to the carrier frequency only. Hence, there can be eliminated erroneous coordinates detection otherwise caused by addition of the above-mentioned high frequency components to the carrier adapted for coordinates detection. Furthermore, since the write signal is turned on and off within each write on/off period S, the quantities which the LPF 150 and BPF 152 have to suppress are reduced to in turn favorably reduce the overall circuit scale.

Figure 12:
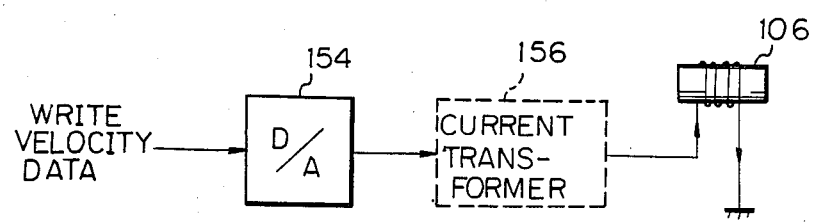
FIG. 12 is a diagram of a circuit adapted to deliver a drive current to the magnetic pen.

Referring to FIG. 12, there is shown in a block diagram an exemplary arrangement for applying a drive current to the pen 106 of the first embodiment, which comprises an electromagnet. In the event when the pen 106 (or 122) writes (or partially erase) a pattern on the display panel 102, it does not always move at a constant rate and, if not constant, renders a color in different shades. The circuit shown in FIG. 12 is supplied with write velocity data which is a digital signal indicative of a moving velocity of the pen 106 during a write mode, which is effected by the control 134. A digital-to-analog (D/A) converter 154 converts the digital data to an analog signal which is then applied to the coil of the pen 106 either directly or through a current transformer 156, which is adapted to vary the current value. The magnetism of the pen 106 is increased or decreased responsive to an increase or a decrease in the velocity of the pen 106, thereby preventing different color shades from occurring. The circuit shown in FIG. 12 may similarly be connected to the pen 122 in order to allow a pattern to be partially erased to a single shade.

In accordance with the first embodiment described above, since both the entry of data and the writing of data for display can selectively be performed on the input/output panel 100, the resulting input/output device saves space, compared to the prior art projection type display, and cuts down cost.

While in the first embodiment a pattern is displayed on the display panel 102 in black in a white background, it will be apparent that a white pattern appears in a black background if the magnet bar 124 is disposed at the input surface side so as to erase a pattern being displayed at that side. In that case, the pen 130 is capable of writing a pattern responsive to input data because the pen 106 wil be located at the back of the input/output panel 100.

Figure 13:
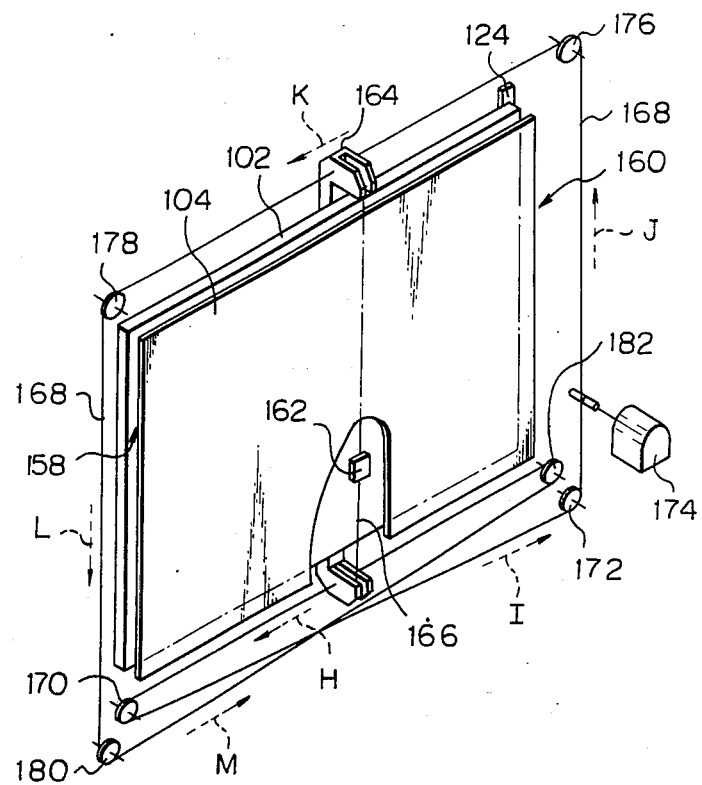
FIG. 13 is a perspective view of a second embodiment of the graphic input device in accordance with the present invention.

Referring to FIG. 13, a second embodiment of the graphic input device of the present invention is shown in a perspective view. This particular embodiment differs from the first embodiment in that an input/output panel 160 is provided with a clearance 158 between the display panel 102 and the transparent input panel 104, and in that a carriage 162 with a magnetic display write pen, not shown, is movbaly disposed in the clearance 158. The entry of data by means of the pen, not shown, is at performed at the input panel 102 side. In the first embodiment, since the display write pen 106 moves over the input surface, data cannot be written into the display panel 102 responsive to an input to the pen 130 unless the pen 130 is provided with a magnet for writing data in an input mode. In contrast, since the carriage 162 in the second embodiment which is provided with the display write pen is movable at the back of the input panel 104, the position of the carriage 162 can be controlled responsive to a graphic signal representative of input coordinates of an input pen such that a pattern is written and displayed with the carriage 162 following an input, which is entered by the pen.

As described later in detail, the carriage 162 is retained by a wire 166 which runs between the upper and lower ends of a bar 164, which in turn is movable at the back of the input/output panel 160. In this construction, the carriage 162 is movable up and down within the clearance 158 between the display panel 102 and the input panel 104. A wire 168 which is adapted to horizontally move the bar 164 is anchored to the lower end of the bar 164 and extends therefrom to pulleys 170 and 172. After being passed over the pulleys 170 and 172, the wire 168 is wound around an output shaft of a motor 174, then passed over a pulley 176, and then anchored to the upper end of the bar 164. Further, the wire 168 extending from the upper end of the bar 164 is passed over pulleys 178, 180 and 182 and then anchored to the lower end of the bar 164. When the motor 174 is rotated in such a manner as to pull the lower end of the bar 164 as indicated by an arrow H, for example, the wire 168 will move as indicated by arrows I, J, K, L and M causing the upper and lower ends of the bar 164 to move in the same direction and over the same distance and, thereby, bodily moving the bar 164 horizontally.

Referring to FIGS. 14A and 14B, there is shown a specific construction associated with the second embodiment and designed to interlock the magnetic display write pen and the magnetic partial erase pen. As shown in FIG. 14B, a carriage 162 loaded with a magnetic display write pen and a carriage 184 loaded with a magnetic partial erase pen are positioned at opposite sides of the display panel 102 and retained by the wire 166 such that their pens assume the same coordinates. Shown in FIG. 14A is a mechanism for moving the carriage 184 up and down along the length of the bar 164. Shafts which support pulleys 186, 188, 190 and 192 are fixed to the bar 164 which, as previously mentioned, is movable horizontally driven by the wire 168. Shafts which support pulleys 194 and 196 are fixed to the carriage 184. A wire 200 which is wound around an output shaft of a motor 198 is anchored at opposite ends to a frame of the input/output panel, not shown, and sequentially passed over pulleys 186, 202, 188, 204, 206, 190, 208 and 192 as seen from one end toward the other end. When the motor 198 is driven in a direction for pulling the wire 200 as indicated by an arrow N, for example, the pulleys 188, 204, 206, 190 and 208 are rotated each in a direction indicated by an arrow with the pulleys 186 and 192 unmoved, thereby driving the carriage 184 as indicated by an arrow Q.

FIG. 14B shows a mechanism for moving the carriage 162 to the same level as the carriage 184. The wire 166 which is anchored to the carriages 162 and 184 is sequentially passed over pulleys 210, 212, 214, 216, 218 and 220 the shafts of which are fixed to the bar 164. When the carriage 184 is moved as indicated by the arrow Q as previously stated in relation to FIG. 14A, it moves the wire 166 with the result that the pulleys 210, 212, 214, 216, 218 and 220 are each rotated as indicated by an arrow causing the carriage 162 to move over the same distance as the carriage 184 in the direction Q. In this manner, the pens on the carriages 162 and 184 move in an interlocked relation sharing the same coordinates.

With the above described construction wherein the carriage 162 with a display write pen is movable at the back of the input panel 104, the display allows data to be written for display responsive to pen inputs and allows a magnetic write pen for display and a magnetic partial erase pen to be interlocked to each other. The interlocked pens reduce the drives for display writing and partial erasing to a single integral configuration and, thereby, further trims the overall dimensions of the display.

The second embodiment discussed above, like the first embodiment, realizes an input/output device which saves space and cost. The motors 174 and 198 in the second embodiment, like the motor 116 in the first embodiment, are implemented by pulse motors or servo motors which are selectively and suitably supplied with a graphic signal representative of a pen position in an input mode, a graphic signal transmitted from another device, a graphic signal read out of a storage, etc., in order to control the positions of their associated carriages 162 and 184.

In summary, it will be seen that a graphic input/output device of the present invention is far more space- and cost-effective than prior art devices because an input/output panel thereof comprises an input panel and a magnetophoretic display panel which are superposed on each other, and because a magnet for writing and erasing patterns and a drive mechanism therefor are used.

Various modifications will become possible for those skilled in the art after receiving the teachings of the present disclosure without departing from the scope thereof.

What is claimed is:

1. A magnetophoresis type display for displaying entered character and graghic patterns, said display comprising:
a display panel having two opposing flat sheets at least one of which is transparent, a clearance defined between opposing surfaces of said two sheets, a plurality of partitions disposed in said clearance, a plurality of cells defined by said partitions, and a viscous liquid containing particles of a magnetic material and filling each of said cells;
writing means having a first magnetic pen for generating in a write mode a magnetic field which attracts the magnetic particles, a first guide mechanism for moving said first magnetic pen to a write position over one of opposite surfaces of the display panel, the first guide mechanism comprising a first bar which is movable over parallel paths across and from one side to the other side of said one surface of the display panel, and a first carriage slidable on and along said first bar, said first carriage being loaded with the first magnetic pen; and
partial erasing means having a second magnetic pen for generating a magnetic field which attracts the magnetic particles, a second guide mechanism for moving said second magnetic pen to a partial erase position over the other surface of the display panel, the second guide mechanism comprising a second bar movable over parallel paths across and from one side to the other side of said other surface of the display panel, and a second carriage slidable on and along said second bar, said second carriage being loaded with the second magnetic pen.

2. A magnetophoresis type display as claimed in claim 1, wherein said first and second bars are constructed to move in an interlocked relation to each other.

3. A magnetophoresis type display as claimed in claim 1, wherein the first and second bars are constructed to move in an interlocked relation to each other, the first and second carriages respectively being guided along the first and second bars with centerlines of the first and second magnetic pens aligned with each other.

4. A magnetophoresis type display as claimed in claim 1 wherein the magnetic field developed by the second pen acts over a range which is wider than a range over which the magnetic field developed by the first pen acts.

5. A magnetophoresis type display as claimed in claim 1 wherein at least one of the first and second magnetic pens develops the magnetic field which acts over a selectable range.

6. A magnetophoresis type display as claimed in claim 1 wherein the first carriage is loaded with a plurality of the first magnetic pens in a predetermined arrangement.

7. A magnetophoresis type display as claimed in claim 7 wherein the first magnetic pens are arranged in a matrix.

8. A magnetophoresis type display as claimed in claim 6, wherein the first magnetic pens are arranged in a line.

9. A magnetophoresis type display as claimed in claim 6 wherein the first magnetic pens are arranged in staggered positions.

10. A magnetophoresis type display as claimed in claim 1 wherein the second carriage is loaded with a plurality of the second magnetic pens in a predetermined arrangement.

11. A magnetophoresis type display as claimed in claim 10 wherein the second magnetic pens are arranged in a matrix.

12. A magnetophoresis type display as claimed in claim 10 wherein the second magnetic pens are arranged in a line.

13. A magnetophoresis type display as claimed in claim 10 wherein the second magnetic pens are arranged in staggered positions.

14. A graphic input device which indicates coordinates of an input position of a pen adapted to input character and graphic patterns, comprising:
   an input panel having an input surface on which two groups of conductors are arranged in a grid configuration;
   a display panel consisting of two flat sheets which face each other, a clearance defined between opposing surfaces of said two sheets, a plurality of partitions disposed in said clearance, a plurality of cells defined by said partitions, and viscous liquid containing particles of a magnetic material and fillilng each of said cells, said display panel being superposed on said input panel to constitute an input/output panel;
   an input pen having a coil for selectively magnetically coupling with the conductor groups of said input panel in an input mode;
   display input means having a plurality of magnets for applying magnetic attraction to the magnetic particles when the display panel is accessed;
   drive means for moving said magnets to an access position responsive to an electric signal indicative of a particular position; and
   coordinates detecting means for locating a magnetic coupling between the conductor groups of the input panel and the pen and, thereupon, generating an electric signal indicative of input coordinates of the pen which is associated with the magnetic coupling.

15. A graphic input device as claimed in claim 14 wherein the input/output panel has the input panel and the display panel which are intimately engaged with each other, one of opposite surfaces of the input/output panel being used as an input surface for the pen.

16. A graphic input device as claimed in claim 15, wherein the pen comprises a magnet which is built in a tip of the pen for writing patterns into the display panel.

17. A graphic input device as claimed in claim 14 wherein the input/output panel has the input panel, which is transparent, superposed on the display panel at a spacing from the display panel, a first one of the magnets of the display input means being retained by the drive means to be movable within said spacing, a surface of the input/output panel which is adjacent to the input panel being used as an input surface for the pen.

18. A graphic input device as claimed in claim 17, wherein a second one of the magnets of the display input means is positioned at the opposite side of the display panel to said first magnet, the drive means having an interlocking mechanism for moving said first and second magnets to a same coordinates position.

19. A graphic input device as claimed in claim 14, wherein the display input means comprises a magnet for accessing over one surface of the display panel to write a pattern, and a magnet for accessing over the other surface of the display panel to partially erase a pattern.

20. A graphic input device as claimed in claim 19, wherein the magnets comprise electromagnets each being energized by a current only when accessing over the display panel.

21. A graphic input device as claimed in claim 19, wherein the magnets comprise permanent magnets which are moved close to the surfaces of the display panel associated therewith only when accessing over the display panel.

22. A graphic input device as claimed in claim 21, wherein a value of the current applied to each of the electromagnets is variable responsive to a velocity of movement of said electromagnet.

23. A graphic input device as claimed in claim 14, wherein the display input means comprises an elongate permanent magnet for full erase accessing which is movable to fully sweep one of opposite surfaces of the display panel.

* * * * *